(12) United States Patent  
Cummins

(10) Patent No.: US 7,293,658 B2  
(45) Date of Patent: Nov. 13, 2007

(54) DRUM FILTER ASSEMBLY

(75) Inventor: Ian Geoffrey Cummins, Gaven Queensland (AU)

(73) Assignee: Cumminscorp Limited, Brisbane, Queensland (AU)

( * ) Notice: Subject to any disclaimer, the term of this patent is extended or adjusted under 35 U.S.C. 154(b) by 0 days.

(21) Appl. No.: 11/401,881

(22) Filed: Apr. 12, 2006

(65) Prior Publication Data

US 2006/0180533 A1    Aug. 17, 2006

Related U.S. Application Data

(62) Division of application No. 10/478,210, filed on Nov. 28, 2003, now Pat. No. 7,029,577.

(30) Foreign Application Priority Data

| Sep. 12, 2001 | (AU) | ................................ PR7600 |
| Dec. 17, 2001 | (AU) | ................................ PR9474 |
| Apr. 4, 2002 | (AU) | ................................ PS1509 |

(51) Int. Cl.  
*B01D 33/067* (2006.01)  
*B01D 33/11* (2006.01)  
*B01D 33/50* (2006.01)  
*B01D 33/76* (2006.01)

(52) U.S. Cl. ............... 210/359; 210/391; 210/394; 210/403; 210/404

(58) Field of Classification Search ............... 210/156, 210/359, 391, 393, 394, 402, 403, 404, 409–411  
See application file for complete search history.

(56) References Cited

U.S. PATENT DOCUMENTS

| 2,016,123 | A | | 10/1935 | Schorr |
| 2,056,445 | A | * | 10/1936 | Damman .................... 210/157 |
| 3,651,785 | A | | 3/1972 | Quinn |
| 4,017,394 | A | * | 4/1977 | Hensley ..................... 210/157 |
| 4,052,960 | A | | 10/1977 | Birkbeck |
| 4,062,776 | A | * | 12/1977 | Blok .......................... 210/205 |
| 4,210,539 | A | * | 7/1980 | Shiban ....................... 210/391 |
| 4,236,999 | A | * | 12/1980 | Burgess et al. ............. 209/240 |
| 4,298,473 | A | * | 11/1981 | Wyman ...................... 210/213 |
| 4,426,289 | A | * | 1/1984 | Svehaug .................... 210/403 |
| 4,439,320 | A | * | 3/1984 | Blok .......................... 210/394 |
| 4,612,876 | A | | 9/1986 | Tigert |
| 4,842,726 | A | | 6/1989 | Willinger |
| 5,008,010 | A | * | 4/1991 | Langner ..................... 210/232 |
| 5,520,808 | A | * | 5/1996 | Stoneburner et al. .... 210/380.1 |
| 5,558,042 | A | | 9/1996 | Bradley |
| 5,593,574 | A | | 1/1997 | Van Toever |

(Continued)

FOREIGN PATENT DOCUMENTS

EP    0209932    1/1987

(Continued)

*Primary Examiner*—Fred G. Prince  
(74) *Attorney, Agent, or Firm*—Hoffman, Wasson & Gitler

(57) ABSTRACT

A drum filter assembly comprising a hollow drum filter having a longitudinal axis and an outer filter screen or mesh material, the drum filter being supported on external rollers for rotation about its longitudinal axis and an inlet for introducing liquid to be filtered into the interior of the drum filter. Rotation of the drum filter is effected by the liquid flowing into the drum filter. Alternatively, the drum filter may be driven by an external motor.

17 Claims, 6 Drawing Sheets

U.S. PATENT DOCUMENTS

| | | | |
|---|---|---|---|
| 5,820,759 A | 10/1998 | Stewart et al. | |
| 5,853,585 A * | 12/1998 | Nesseth | 210/394 |
| 5,894,936 A * | 4/1999 | Sanders et al. | 209/270 |
| 5,957,085 A | 9/1999 | Youngstrom et al. | |
| 5,961,831 A | 10/1999 | Lee et al. | |
| 6,117,313 A | 9/2000 | Goldman et al. | |
| 6,234,113 B1 | 5/2001 | Dor | |
| 6,393,899 B1 | 5/2002 | Shedd et al. | |
| 6,432,312 B1 | 8/2002 | Fuss | |
| 6,443,097 B1 | 9/2002 | Zohar et al. | |
| 6,447,681 B1 | 9/2002 | Carlberg et al. | |
| 6,499,431 B1 | 12/2002 | Lin et al. | |
| 6,584,935 B2 | 7/2003 | Zohar et al. | |
| 6,722,314 B1 | 4/2004 | Crisinel et al. | |

FOREIGN PATENT DOCUMENTS

| | | | |
|---|---|---|---|
| EP | 0934697 | | 8/1999 |
| FR | 2255845 | | 8/1975 |
| FR | 2584948 | | 1/1987 |
| JP | 3-109909 | * | 5/1991 |
| WO | WO 97/49279 | | 12/1997 |

* cited by examiner

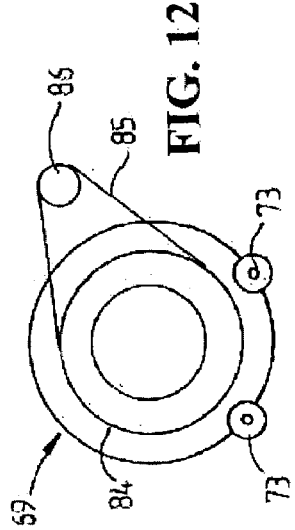
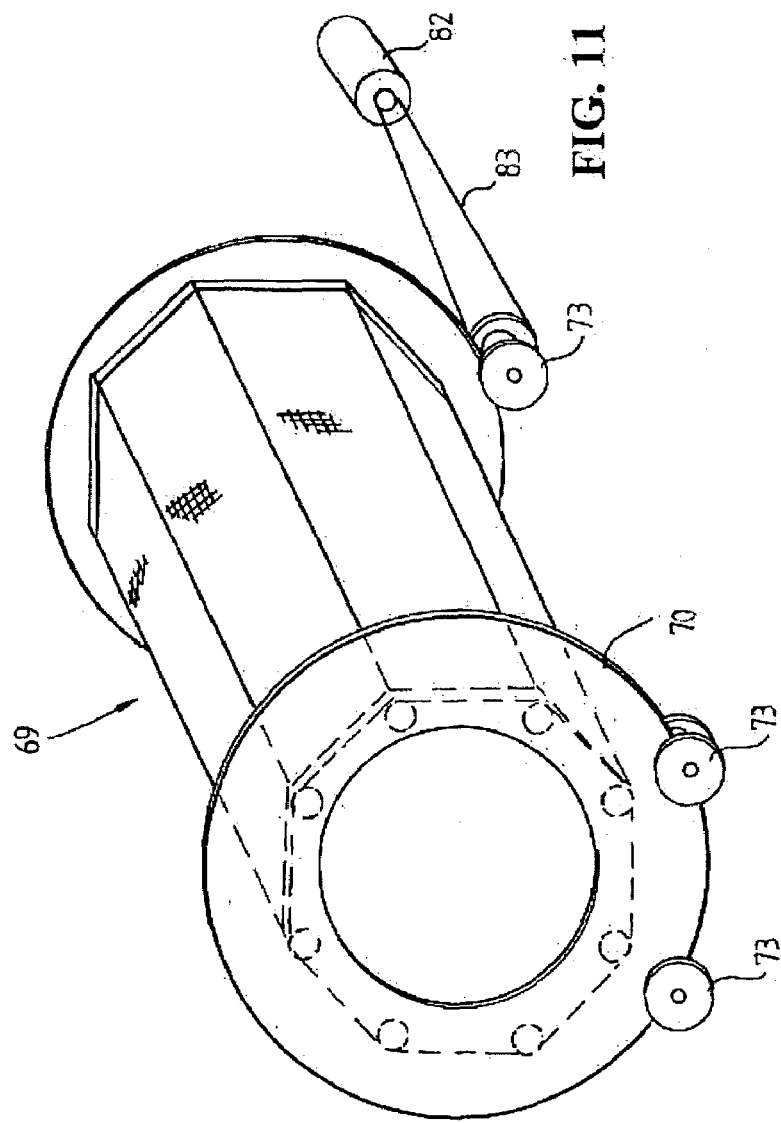

DRUM FILTER ASSEMBLY

CROSS REFERENCE TO RELATED APPLICATION

This application is a division of U.S. application Ser. No. 10/478,210, filed Nov. 28, 2003, which matured into U.S. Pat. No. 7,029,577, on Apr. 18, 2006.

BACKGROUND OF THE INVENTION

This invention relates to a drum filter assembly which is suitable for use in aquaculture systems but which may be used in any other water treatment application.

Aquaculture has commonly been conducted by growing fish, prawns and other marine invertebrates in outdoor ponds. The ponds however eventually become polluted because faeces, uneaten food and algae work their way to the bottom of the ponds. This makes the ponds almost impossible to clean. In addition large quantities of valuable water are required to keep these systems functional. Other disadvantages are also associated with outdoor aquaculture systems. For example pests can eat stock, adverse weather conditions such as floods can cause stock loss by washing the stock away and very hot weather can cause growth of algal blooms which can kill the stock. In addition in very hot or very cold weather, the stock will stop growing. Muddy waters or disturbed water can also cause the stock to have an unpalatable taste.

In order to overcome the above disadvantages, indoor commercial aquaculture systems were introduced where fish or other marine invertebrates are grown in tanks placed in large buildings or sheds.

A disadvantage of the known systems is that the buildings or sheds housing the aquaculture system resemble a maze of pipes and plumbing as water is pumped between the system components such as tanks, filters, biological filters, foam fractionators, ultraviolet water treatment units and other water treatment components. These components are individual components which have to be set up in different parts of the building.

Drum filters have been a part of the aquaculture systems for filtering the water of fine waste particles created from waste food, faeces, and other extraneous matter. The majority of filters are electric motor driven off central drive shafts with bearings on which the drum filter is supported for rotation. In most cases the cleaning takes place through a centre mounted vertical disc through which the water must pass. The drum filters are separate units and include an outer housing which is specifically designed to hold the filter and its supporting components and to also hold the water. Water inlets and outlets must also be provided along with special float switches to activate a cleaning process when the water level rises.

As a general rule, during cleaning the water flow is stopped or bypassed which allows uncleaned water back into the fish tanks. If the water is stopped for any length of time, it can be very detrimental to the fish stock as in times of heavy stock loading, the fish can only stay alive for around six minutes before fatalities begin to occur. Another major drawback is that if a bearing or another major mechanical failure happens, removal the drum filter and all of the fittings is extremely time consuming and in many cases can lead to total stock losses. Cleaning of the current drum filters in any event is difficult as easy access cannot be had to the interior of the drum.

SUMMARY OF THE INVENTION

The present invention aims to provide an improved drum filter particularly suited for use in aquaculture systems but which may also be used in other water treatment apparatus. Other objects and advantages of the invention will become apparent from the following description.

The present invention thus provides in a first preferred aspect a drum filter assembly comprising a hollow drum filter, said drum filter having a longitudinal axis and an outer filter screen or mesh material, means externally of said drum filter for supporting said drum filter for rotation about its longitudinal axis, an inlet for introducing liquid to be filtered into the interior of said drum filter, and means for rotating said drum filter about said longitudinal axis.

Preferably cleaning means are provided externally of the drum filter for cleaning the filter screen or mesh material. The cleaning means may comprise means above the drum filter for spraying water against the screen or mesh material. The means for spraying water may comprises an elongated feed tube extending longitudinally of the drum filter, the feed tube having one or more water spray outlets. The cleaning means may additionally or alternatively comprises means for applying pressurized air against the screen or mesh material. The means for applying pressurized air may comprises an elongated air tube extending longitudinally of the drum filter, the air tube having one or more pressurized air outlets.

Means are preferably provided internally of the drum filter for catching and collecting materials dislodged from the filter screen or mesh material by the cleaning means. The means for catching dislodged materials comprises a hopper internally of and extending longitudinally of the drum filter. The hopper may communicate with a waste line for directing those materials to waste. The hopper may extend beyond one or opposite ends of the drum to ensure that substantially all material dislodged from the drum is collected.

The inlet suitably also comprises a supply duct having one or more liquid outlets. The supply duct may extend longitudinally of the drum filter. In one form, the liquid outlets are preferably provided within the drum filter. The liquid outlets may be defined by radially extending duct members. The supply duct may have a baffle beyond the duct members to prevent liquid passing out of the drum filter. The hopper may communicate with an extending portion of the supply duct beyond the baffle which is connected to or communicates with a waste.

The external support means for the drum filter may comprise rotatable rollers which support the drum filter such that its longitudinal axis is substantially horizontal.

Preferably the drum filter includes a pair of end members having a circular periphery supported on the rollers for rotation about the longitudinal axis. At least one of the end members may comprise an annular member having a central opening comprising the inlet. Alternatively the end members may comprise a circular member.

Preferably the drum filter has a plurality of rotation members adapted to cooperate with a flowing liquid to effect rotation of the drum filter. The rotation members may be provided internally of the drum filter. Preferably the rotation members comprise circumferentially spaced members.

In another form the rotation members are provided on the exterior of the drum filter.

The flowing liquid suitably comprises liquid flowing from the one or more liquid outlets.

In another driving arrangement, means may be provided for rotatably driving at least one said roller to effect rotation of said drum filter. Alternatively means coupled to the drum filter may be provided for directly rotating the drum filter. The means for rotating the drum filter may comprise a motor coupled to the drum filter.

The drum filter suitably includes a plurality of circumferentially spaced members extending longitudinally between the end members, said filter screen or mesh material being supported by the circumferentially spaced members. The screen or mesh material thus extends around the periphery of the drum filter. The circumferentially spaced members may comprise ribs which extend between and are fixed to the end members of the drum filter. Where the drum filter is driven by liquid flowing from the liquid outlets, the liquid outlets are preferably positioned adjacent to the ribs. The outlets are suitably spaced along the supply duct.

BRIEF DESCRIPTION OF THE DRAWINGS

In order that the invention may be more readily understood and put into practical effect reference will now be may to the company drawings which illustrate the preferred embodiments of the invention and wherein:

FIGS. 11 and 12 illustrate alternative drive systems for the drum filter.

DETAILED DESCRIPTION OF THE PREFERRED EMBODIMENTS

Figure 4:
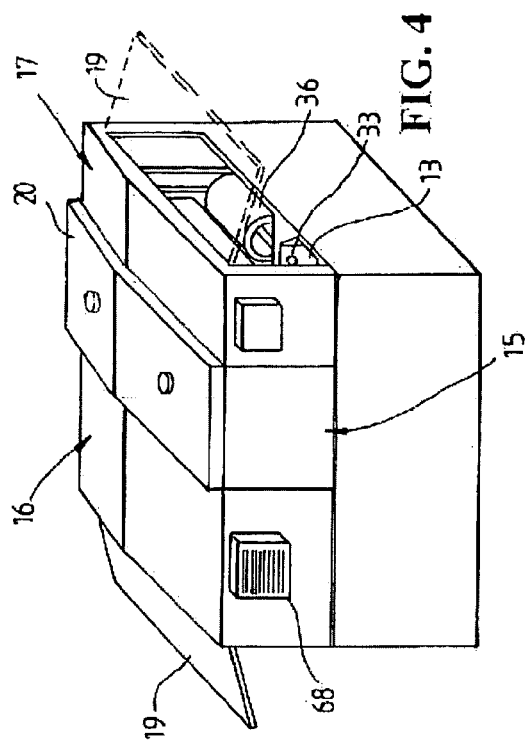
FIG. 4 illustrates the building of FIG. 1 with the end flaps open.

Referring to the drawings and firstly to FIGS. 1 to 4, there is illustrated an aquaculture system 10 in accordance with an embodiment of the invention in the form of a modular building 11 comprising and defining a main chamber 12 for holding fish or marine invertebrates, a swirl chamber 13 which serves as a primary filter and a biological filter-drum or screen filter chamber 14 of a secondary filter. The chambers 12, 13 and 14 have their bases at substantially at the same level however the water level in each chamber is controlled such that the level in chamber 14 is less than the level in chamber 13 and the level in chamber 13 is less than the level in chamber 12. This then allows flow of water from the main chamber to the swirl chamber 13 and then to the chamber 14 under the influence of gravity without pumping. The building module 11 also defines a biological filter tank 15 which is elevated and located above the main chamber 12. Opposite end integral hip roof and wall sections 16 and 17 extend from opposite sides of the tank 15 and over the main chamber 12 and swirl chamber 13 and filter chamber 13 respectively to define enclosed air spaces over the main chamber 12 and chambers 13 and 14. The building 11 may be constructed of any suitable materials such as steel, timber, fiberglass or any other mouldable materials, or any other materials however the preferred material of construction is concrete suitably a concrete which is waterproof and provides sufficient strength to the building 11 and additionally has high insulation properties such that no additional insulation is required and further facilitates moulding of the tank 12 and chambers 13,14 and 15. The main chamber 12 and chambers 13 and 14 may be formed as one moulding indicated generally at 18, and the tank 15, and roof and wall sections 16 and 17 as separate mouldings which are then assembled and jointed to the lower moulding 18. Opposite end walls of the tank 15 and roof and wall sections 16 and 17 are thus aligned with the opposite side walls of the moulding 18 and the outer ends walls of the roof and wall sections 16 and 17 are aligned with opposite end walls of the moulding 18. The opposite end walls of the roof and wall sections 16 and 17 are closed by hinged panels 19 which may be pivoted upwardly as shown in FIG. 4 to provide access at one end to the chamber 12 or at the other end to the chambers 13 and 14. The biological filter tank 15 is also closed by upper lid panels 20 which are hingedly mounted by central hinges 21 to enable them to be lifted to provide access to the interior of the chamber 15. It will be apparent that when they panels 19 are closed, the building 11 defines a fully enclosed air space over the chambers which facilitates control of air and water temperature as described further below.

Figure 5:
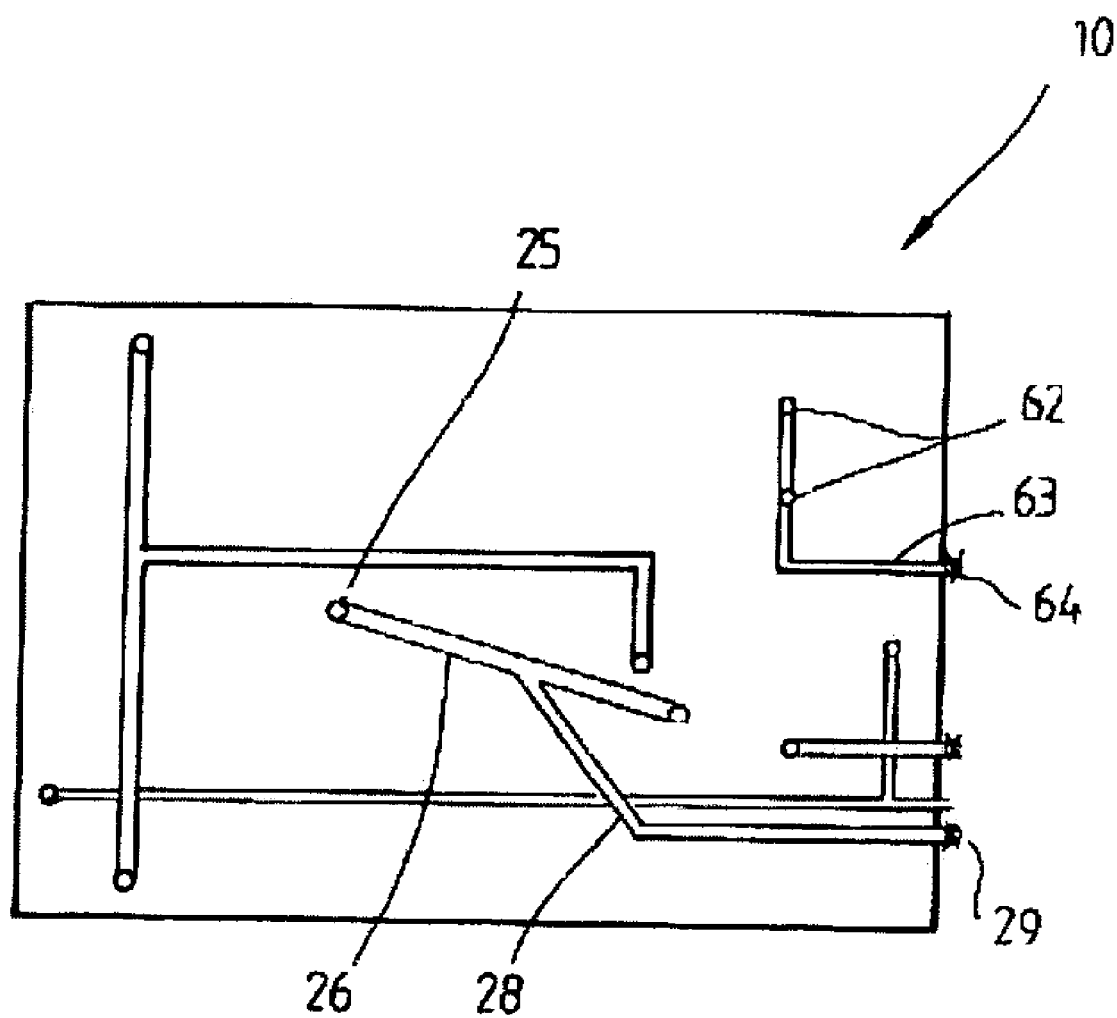
FIG. 5 illustrates the layout of the plumbing pipes of the system incorporated in the base or foundation of the building module.
Figure 6:
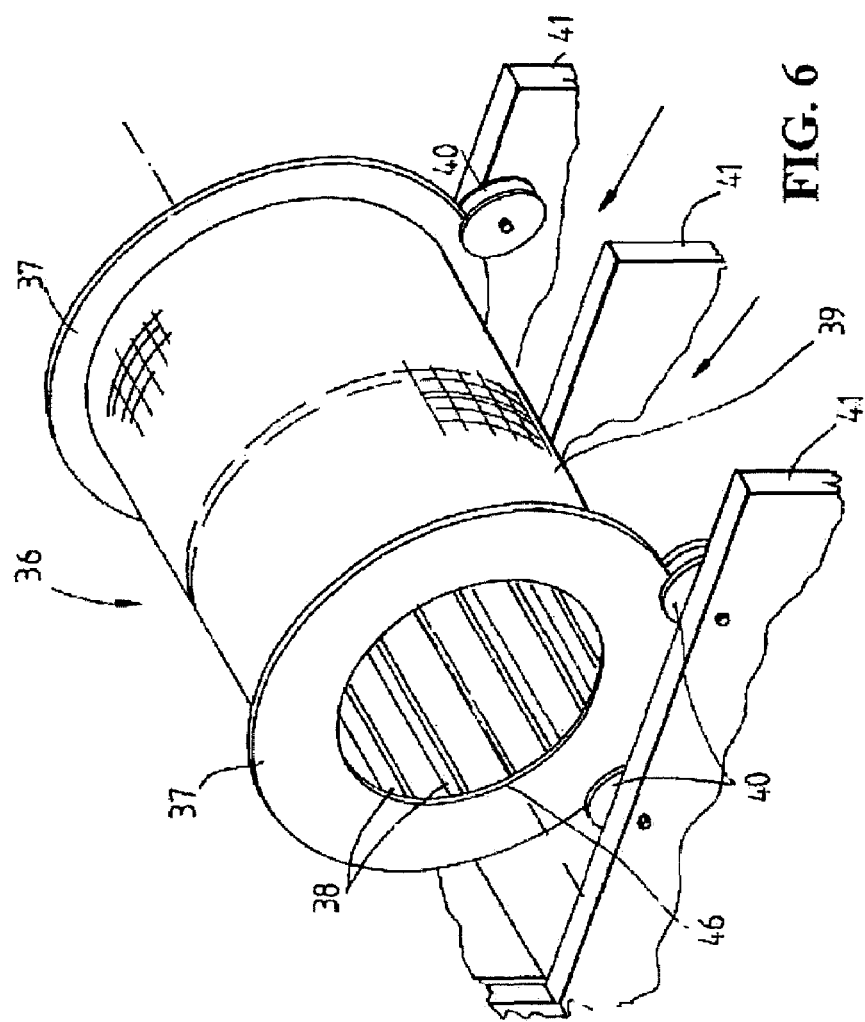
FIG. 6 is a perspective view of the drum filter for use in the system and its manner of support.
Figure 8:
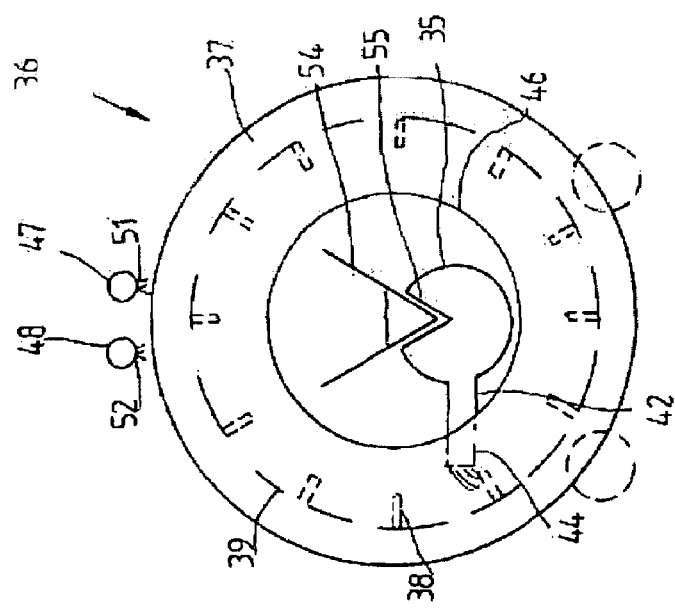
FIG. 8 is an end view in the direction A of FIG. 7.
Figure 7:
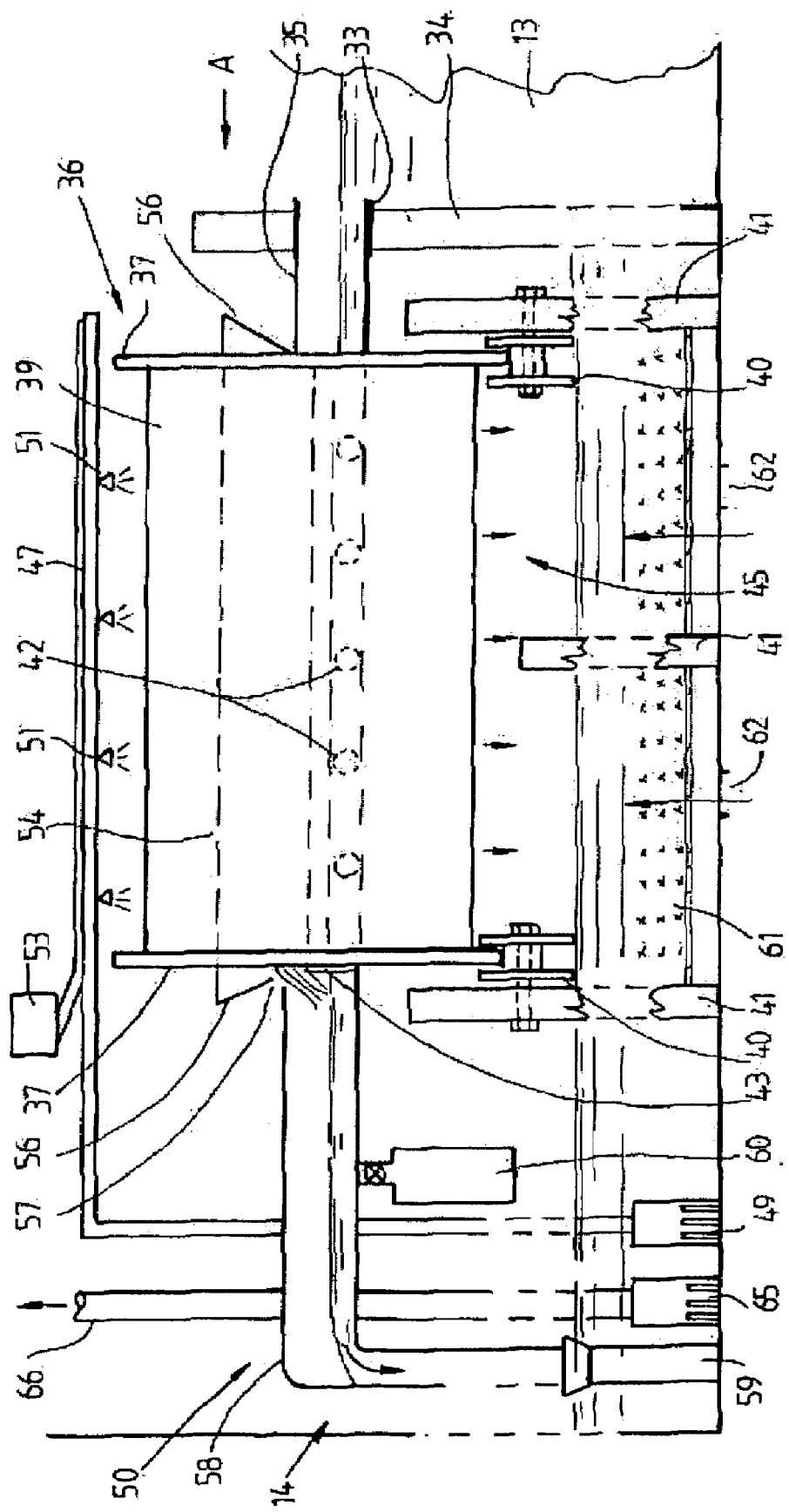
FIG. 7 is a side view showing the drum filter and associated feed, discharge and cleaning components.

The main chamber 12 is of a generally rectangular or square configuration with the corners thereof being truncated as at 22. A spillway 23 is provided on one side of the chamber 12 and at an elevated location to convey water in the chamber 12 above the level of the spillway 23 into the swirl chamber 13. This acts as a skimmer to remove any floating scum or other materials from the surface of the water in the chamber 12. A screen 24 of mesh-like form is provided across the spillway 23 to prevent fish from escaping from the main chamber 12 into the swirl chamber 13. The main chamber 12 also includes a central drain outlet 25 which communicates through a passage 26 with the periphery of the base of the swirl chamber 13 at 27 which directs water from the chamber 12 into the chamber 13 in a generally circumferential direction such as to effect anticlockwise swirling motion of water in the chamber 13. The passage 26 carries fish and food waste from the main chamber 12 into the swirl chamber 13 without the use of pumping equipment which may breakup particles within the chamber 12. The passage 26 may also have a branch line 28 through which water may be drained from the chamber 12 under the control of a valve 29 externally of the building module 10 (see FIG. 5).

The main chamber 12 also includes in the outer pair of truncated corners 22, a pair of foam fractionators 30 for oxygenating and cleaning the water in the main chamber 12. Associated with each foam fractionator 30 is an ultraviolet unit 31 for killing pathogens in the water and optionally one or more ozone reactor or generator units 32 for introducing ozone into the water in the fractionator 30 for sterilizing the water.

The foam fractionator 30 communicates with the main chamber 12 via the ultraviolet unit 31 which houses an elongated ultraviolet light generator whereby water before passing into the foam fractionator 30 is exposed to ultraviolet light.

The ozone generator unit 32 houses an ozone reactor or generator o inject ozone into the water in the foam fractionator 30 for passage as bubbles upwardly through water in the foam fractionator 30 to expose the water therein to ozone.

Thus water for treatment in the foam fractionator 30 initially passes through the ultraviolet unit 31 where it is exposed to ultraviolet light which will destroy pathogens in the water. Air supplied to the foam fractionator 30 exits as bubbles in the water which pass upwardly through the fractionator 30 to carry dirt and fat particles or other impurities in the water to the surface. In addition, the ozone reactor or generator unit 32 creates bubbles of ozone which also pass upwardly through the fractionator 31 to sterilize and clean the water.

The swirl chamber 13 is of a generally hexagonal shape to assist in the swirling of water flow and receives water through the spillway 23 from the main chamber 12 which carries floating wastes into the chamber 13. The spillway 23 enters the chamber 13 at the periphery thereof and at a generally tangential orientation to induce into the chamber 13 a circulating or swirling flow. The outlet 27 which communicates with the base of the chamber 12 also is directed generally circumferentially or tangentially to induce swirling of flow of water in the chamber. As the water level in the chamber 13 is below that in the chamber 12, water will flow from the chamber 12 into the chamber 13 from the top and bottom thus carrying wastes into the chamber 13. The swirling flow of water will cause heavy particles fish and foot waste to collect centrally at the base of the chamber 13.

A water outlet 33 extends through a side wall 34 of the chamber 13 to direct water from the chamber 13 into the filter chamber 14, the wall 34 being common to both chamber 13 and chamber 14. The outlet 33 is below the level of the spillway 23 and thus sets the normal level of water in the chamber 13 below the level in the main chamber 12. A feed pipe 35 is releasably coupled to the outlet 33 through a male/female connection and extends centrally and coaxially through a drum filter 36 for the fine filtering of the water flowing in from the swirl chamber 13. The drum filter 36 as more clearly shown in FIG. 6 includes a pair of annular end members 37 joined by a plurality of longitudinally extending ribs 38 which are spaced around a circumferential line arranged midway between the inner and outer diameters of the annular members 37. The ribs 38 which comprise flat strip-like members have their major dimension lying in substantially radially extending planes as is apparent in FIG. 8 and support a fine filtering screen or mesh 39 which is wrapped circumferentially around the ribs 38 and which is secured to the ribs 38 such as by stapling. Each annular end member 37 is supported by and runs in a pair of free running grooved guide wheels or rollers 40 which are rotatably mounted to a cradle or baffles 41 in the chamber 14 to support the drum filter 36 for rotation about a substantially horizontally axis which extends longitudinally of the drum filter 36. As illustrated in FIGS. 6 to 10, each guide wheel or roller 40 is provided with an annular groove extending around its periphery in which the peripheral portion of an end member 37 of the drum filter 36 locates.

The incoming water through the feed pipe 35 as well as being fed to the drum filter 36 for filtering is also used to rotatably drive the drum filter 36. For this purpose, a series of spaced apart radial ducts 42 extend from the feed pipe 35 and open adjacent the ribs 38. A baffle 43 in the feed pipe 35 prevents water passing straight through the pipe 35. When water flows into the feed pipe 35 and out through the ducts 42 as at 44, it applies a force to the respective ribs 38 to thereby cause rotation of the drum filter 36. In addition, water flowing out of the ducts 42 is filtered by passage through the filter screen 39 as at 45. The end members 37 define through their annular configuration an inner annular lip 46 spaced radially inwardly of the filter screen 36. The lip 46 prevents any water from running out of the open ends of the drum filter 36 before passing through the screen material 39. In the extreme case of the water level rising within the drum filter 36, it cannot jam up the drum filter 36 by over filling as it will simply cascade over the end lips 46 and thus will not prevent the drum filter 36 from rotating.

For cleaning of the filter screen 39, a pair of ducts 47 and 48 are provided above the drum filter 36 to extend longitudinally thereof. One duct 47 is connected to a water pump 49 submerged in an end section 50 of the chamber 14 and has a plurality of spaced nozzles 51 through which water can be directed towards the screen 39 to wash the screen 39. The other duct 48 is also provided with a plurality of spaced nozzles 52 and is connected to an air pump 53. Timers are associated with the water pump 49 and air pump 53 to operate the pumps at regular intervals to force pressurised water and air through the nozzles 51 and 52 and impact against the screen 39 to clean materials gathering on the screen 39. Materials displaced from the screen 39 are collected in a waste collecting trough 54 which is of a hopper-like V-shaped cross section and which is arranged to extend within the drum filter 36 and centrally thereof beneath the cleaning water and air ducts 47 and 48. The waste collector trough 54 receives materials displaced from the filter screen 39 along with the water forced through the screen 39. The waste collector trough 54 sits within a longitudinally extending slot 55 in the feed pipe 35 and projects out of each end of the filter drum 36. The opposite ends 56 of the trough 54 are flared outwardly in a funnel-like configuration to catch all materials washed from the drum filter 36. The end 56 adjacent the section 50 of the chamber 13 extends beyond the baffle 43 and has an opening 57 therein which allows water and fine materials to be discharged into an extended portion 58 of the feed pipe 35 beyond the baffle 43. The end of the extending portion 58 of the feed pipe 35 directs the collected waste into a drainpipe 59, which also serves as an overflow drain if the level of water in the chamber 13 exceeds a predetermined level.

The cleaning ducts 47 and 48 provide the advantage of enabling cleaning of the filter screen 39 while the drum filter 36 it is running at full capacity without stopping of water flow, or for any need to bypass the system. As the drum filter 36 rotates, air or water or both dislodges any fine material clogging the screen 36 and blows or forces it into the V section collector trough 54 for passage into the feed pipe section 58 and then to the drain pipe 59. Water flowing into the drainpipe 59 may be simply discharged to waste. Optionally, a filter bag 60 may be connected to the pipe section 58 via a valve for collecting fines and filtering the collected waste water. The bag 60 may be removed and cleaned or replaced at regular intervals or when clogged or filled with waste. Alternatively or additionally a filter device may be provided in the drainpipe 59 so as to enable waste water to be recycled.

The drum filter 36 may be easily removed by detaching the feed pipe 35 from the outlet 33 and when the pipe 35 is detached, the V-shaped waste collector trough 54 is also detached being supported by the pipe 35. The cleaning water ducts 47 and air ducts 48 can be simply folded down to opposite sides of the filter drum 36. After removal of the feed pipe 35 and trough 54, the entire drum filter 56 can be removed. This means that one drum filter 56 can be removed and another complete drum filter 56 installed quickly if desired.

Water filtered by the drum filter 56 and flowing through the filter screen 59 as at 45 passes to the lower portion of the chamber 14 which contains a bio-filter medium 61 to provide a surface for bacteria to live on. The chamber 14 is also provided with drains 62 being connected to waste via a common duct 63 and valve 64 which can be opened as and when required for draining or cleaning the chamber 14 (see FIG. 5).

One or more submergible pumps 65 are provided in the end section 50 of the chamber 14 to pump water from the chamber 14 to the main biological tank 15 via a duct 66. The pumps 65 operate continuously and cause the circulating flow of water through the whole system 10 and further ensure that the water pumped out of the chamber 14 is the same or greater than water entering the chamber 14 through the feed pipe 35 to thereby maintain the level of water in the chamber 14. The pumps 65 may also be used to augment the cleaning of the screen 39 of the drum filter 36 through a branch line which can be opened to connect the pump or pumps 65 to the spraying duct 47.

Figure 3:
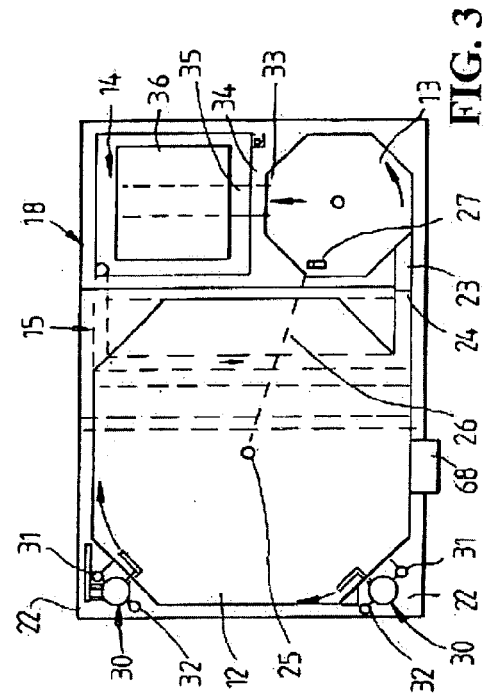
FIG. 3 is a sectional plan view of the building of FIG. 1.
Figure 1:
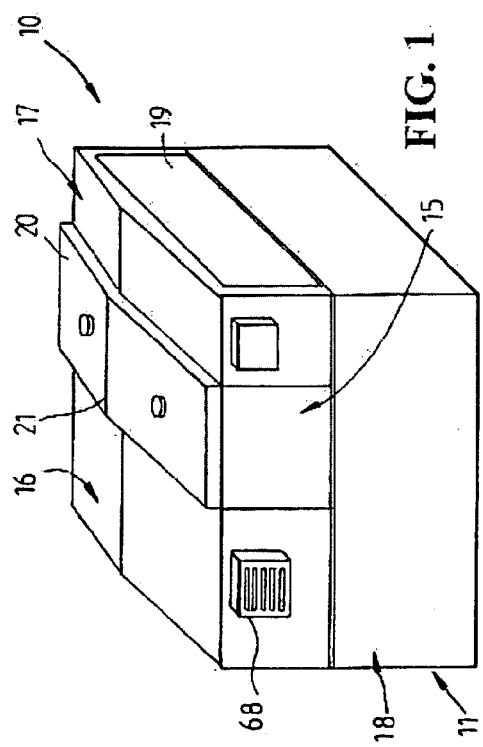
FIG. 1 illustrates in perspective view, a building module defining an aquaculture system incorporating a drum filter according to a first embodiment of the present invention.
Figure 2:
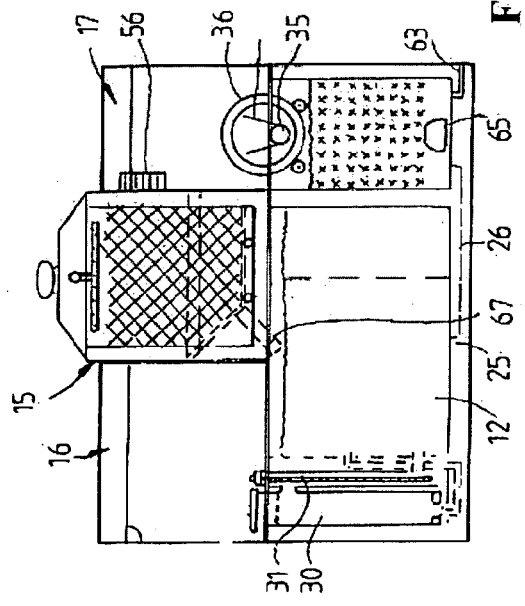
FIG. 2 is a sectional elevational view of the building of FIG. 1.

The base of the tank 15 also includes an inclined section through which one or more water outlets 67 pass from through which water from the tank 15 is returned or recirculated to the main chamber 12 (see FIG. 3).

To control the temperature of air within the building module 11, a reverse cycle air conditioner 68 is provided through a wall in the section 16 of the building 11 over the main chamber 12 to enable temperature within the building module to be controlled by heating or cooling. The conditioned air as well as circulating above the chamber 12 also passes through the air ducts 112 into the region above the swirl chamber 13 and drum filter chamber 14. This maintains a substantially constant temperature within the sections of the building module 11. The air conditioner 68 as well as controlling the air temperature within the building module 11 also controls the temperature of the water circulating through the system 10 as the air pumped by air pump/s through the water in the foam fractionator 30 and bacterial filter tank 15 is derived from the air within the building module 11.

Figure 10:
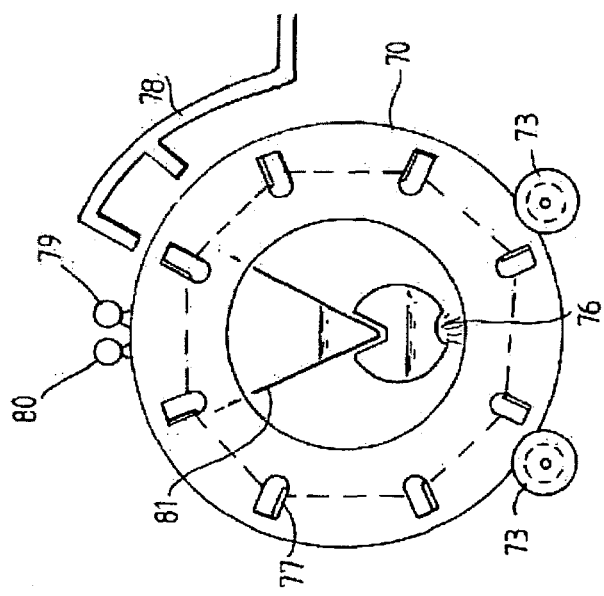
FIGS. 9 and 10 illustrate in side and end views a further embodiment of drum filter for use in the aquaculture system of the invention.
Figure 9:
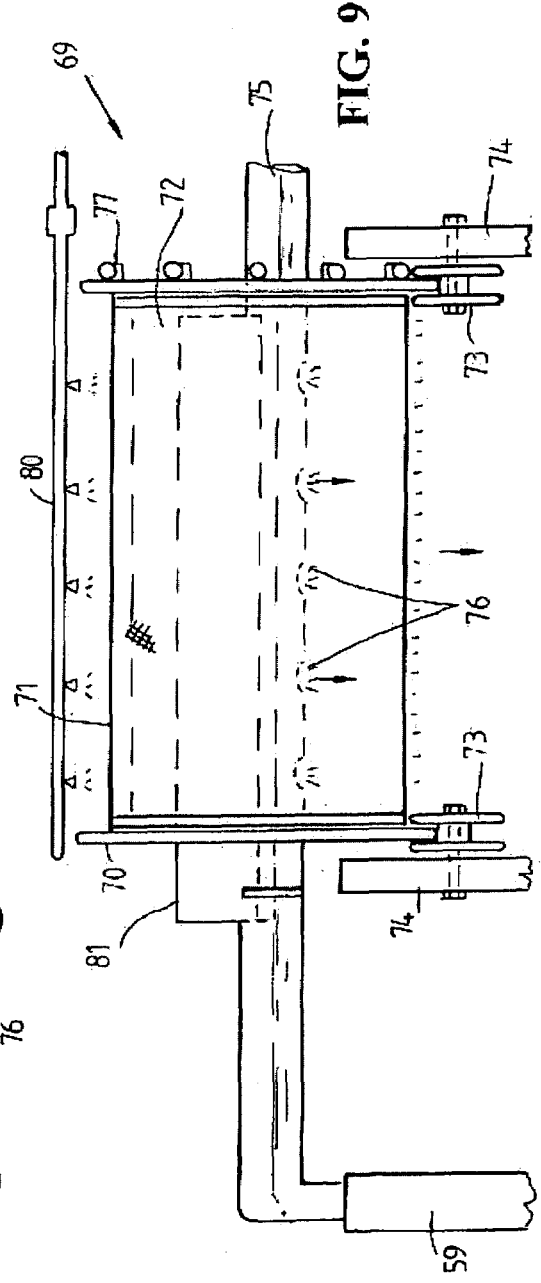

Referring now to FIGS. 9 and 10, there is illustrated a further form of drum filter arrangement for use in the aquaculture system of the invention. The drum filter 69 is of similar construction to the filter 36 of FIG. 6 in that it includes annular end walls 70 joined by longitudinally extending ribs 71 around which a filter fabric or material 72 is wrapped and secured. The filter 69 is also supported for rotation on spaced wheels 73 mounted to baffles 74 and the drum filter 69 is supplied with water from the swirl chamber in by a feed tube 75 in a similar manner to that described with reference to FIG. 7 except that openings 76 in the tube 75 permit water to pass downwardly from the tube 75 through the filtering fabric 72 of the filter 69. To effect rotation of the drum filter 69, one or both ends walls 70 are provided with a number of circumferentially spaced members 77 which may comprise extension of the ends of the ribs 71 and be shaped to cooperate with water supplied through a feed tube 78. This action effects rotation of the drum filter 69 to continuously present a new section of filter fabric 72 to the water exiting the openings 76. As with the embodiment of FIG. 6, air and water cleaning tubes 79 and 80 are provided for spraying at timed intervals water or air through the fabric 72 for collection in the trough 81 for direction to the waste pipe 59.

As an alternative driving arrangement shown in FIG. 11, one or more of the guide wheels 73 may be driven by an electric or hydraulic motor 82 via an endless belt or chain 83 to cause rotation of the driven wheel 73 and thus the drum filter 69 to continuously present a new filtering surface to incoming water. In yet an alternative arrangement shown in FIG. 12, the drum filter 69 may be directly driven by being coupled through a wheel or pulley 84 coaxial with the drum filter 69 and a drive belt or chain 85 to a drive motor 86.

The drum filters described in the above embodiments do not need or use a vertical screen which reduces the area of mesh for the water to strain through, have no centre shaft or bearings, and do not need a special outer housing. The drum filters can be mounted on a simple cradle and suspended over the fish tank if required, and can clean themselves whilst continuing to operate at full capacity. As the drum filters do not have a shaft, components can easily fitted within the interior of the filter. By incorporating the use of compressed air as well as water, the drum filter can clean continually or spasmodically which ever is required. The water and air bars can be set side-by-side for individual use or incorporated into one. Other gases may be used for cleaning provided they are non-toxic or polluting.

The drum filter systems described above may of course be used in aquaculture systems other than those described or in any other filtering application.

What is claimed is:

1. A drum filter assembly comprising:
   a hollow drum filter, said drum filter having a longitudinal axis and an outer filter screen or mesh material,
   rotatable rollers externally of said drum filter for supporting said drum filter for rotation about its longitudinal axis,
   an inlet for introducing liquid to be filtered into the interior of said drum filter, and
   a plurality of circumferentially spaced rotation members within said drum filter, said inlet being arranged to direct said liquid to be filtered against said rotation members to effect rotation of said drum filter about said longitudinal axis.

2. A drum filter assembly as claimed in claim 1 and including means externally of said drum filter for cleaning said filter screen or mesh material.

3. A drum filter assembly as claimed in claim 2 wherein said cleaning means comprise means above said drum filter for spraying water against said screen or mesh material.

4. A drum filter as claimed in claim 3 wherein said means for spraying water comprises an elongated feed tube extending longitudinally of said drum filter, said feed tube having one or more water spray outlets.

5. A drum filter assembly as claimed in claim 2 wherein said cleaning means comprises means for applying pressurized air against the screen or mesh material, said pressurized air applying means comprising an elongated air tube extending longitudinally of said drum filter, said air tube having one or more pressurized air outlets.

6. A drum filter assembly as claimed in claim 2 and including means internally of said drum filter for catching and collecting materials dislodged from the filter screen or mesh material by said cleaning means.

7. A drum filter assembly as claimed in claim 6 wherein said means for catching said dislodged materials comprise a hopper internally of and extending longitudinally of said drum filter.

8. A drum filter assembly as claimed in claim 1 wherein said drum filter includes a pair of end members having a circular periphery supported on said rollers for rotation about said longitudinal axis.

9. A drum filter assembly as claimed in claim 8 wherein each said roller is provided with an annular groove in its periphery in which an end member of said drum filter locates.

10. A drum filter assembly as claimed in claim 8 wherein at least one of said end members comprises an annular member having a central opening comprising said inlet.

11. A drum filter assembly as claimed in claim 1 wherein said inlet comprises a supply duct, said supply duct including one or more liquid outlets for directing said liquid against said rotation members.

12. A drum filter assembly as claimed in claim 11 wherein said supply duct extends longitudinally of said drum filter and includes a plurality of said liquid outlets and wherein said liquid outlets are spaced along said supply duct.

13. A drum filter assembly comprising:
a hollow drum filter, said drum filter having a longitudinal rotation axis, a pair of end members spaced apart along said axis, said end members having a circular periphery, a plurality of ribs extending between said end members and spaced apart in a circumferential direction, and a circumferentially extending filter screen or mesh material supported by said ribs;
a plurality of rollers externally of said drum filter on which said end members are received to support said drum filter for rotation about its longitudinal axis;
means for introducing liquid to be filtered into the interior of said drum filter for filtering though said screen or mesh material; and
wherein said liquid introduced into the interior of said drum acts against said ribs to effect rotation of said drum filter.

14. A drum filter assembly as claimed in claim 13 wherein said means for introducing liquid to be filtered into said drum filter comprises a supply duct within and extending longitudinally of said drum filter, said supply duct having at least one outlet for directing liquid against said ribs.

15. A drum filter assembly as claimed in claim 14 and including means externally of said drum filter for applying water or air against said filter screen or mesh material and a trough within said drum filter for collecting materials dislodged from said screen or mesh material, said trough extending along said supply duct.

16. A drum filter assembly comprising:
a hollow drum filter, said drum filter having a longitudinal axis and an outer filter screen or mesh material,
means externally of said drum filter for supporting said drum filter for rotation about its longitudinal axis,
an inlet for introducing liquid to be filtered into the interior or said drum filter,
a plurality of circumferentially spaced rotation members within said drum filter, said rotation members comprising a plurality of elongated members extending substantially parallel to said longitudinal axis and supporting said filter screen or mesh material, and
said inlet being arranged to direct said liquid to be filtered against said rotation members to effect rotation of said drum filter about said longitudinal axis.

17. A drum filter assembly as claimed in claim 16 wherein said drum filter includes a pair of end members spaced apart along said longitudinal axis, said end members having a circular periphery and wherein said elongated members extend between said end members.

\* \* \* \* \*